United States Patent
Yoon

(10) Patent No.: US 9,493,155 B2
(45) Date of Patent: Nov. 15, 2016

(54) METHOD FOR CONTROLLING DRIVING OF HYBRID VEHICLE

(71) Applicants: Hyundai Motor Company, Seoul (KR); Kia Motors Corp., Seoul (KR)

(72) Inventor: Young Min Yoon, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 176 days.

(21) Appl. No.: 14/288,919

(22) Filed: May 28, 2014

(65) Prior Publication Data

US 2015/0166051 A1     Jun. 18, 2015

(30) Foreign Application Priority Data

Dec. 18, 2013  (KR) .................. 10-2013-0157846

(51) Int. Cl.
| | | |
|---|---|---|
| B60W 20/00 | (2016.01) | |
| B60K 6/48 | (2007.10) | |
| B60W 10/02 | (2006.01) | |
| B60W 10/06 | (2006.01) | |
| B60W 10/08 | (2006.01) | |

(52) U.S. Cl.
CPC ............ B60W 20/40 (2013.01); B60K 6/48 (2013.01); B60W 10/02 (2013.01); B60W 10/06 (2013.01); B60W 20/13 (2016.01); B60K 2006/4825 (2013.01); B60W 10/08 (2013.01); B60W 2510/244 (2013.01); Y02T 10/6221 (2013.01); Y02T 10/6252 (2013.01); Y02T 10/6286 (2013.01); Y10S 903/93 (2013.01); Y10T 477/26 (2015.01)

(58) Field of Classification Search
CPC ............................ B60W 20/40; B60W 20/13
See application file for complete search history.

(56) References Cited

U.S. PATENT DOCUMENTS

| | | | | |
|---|---|---|---|---|
| 7,249,537 B2* | 7/2007 | Lee | ........................ | B60K 6/36 |
| | | | | 74/661 |
| 7,370,715 B2* | 5/2008 | Colvin | .................... | B60K 6/48 |
| | | | | 180/65.28 |
| 2015/0344025 A1* | 12/2015 | Park | ....................... | B60K 6/48 |
| | | | | 701/22 |

FOREIGN PATENT DOCUMENTS

| | | |
|---|---|---|
| JP | 2000-255285 A | 9/2000 |
| JP | 2013-79005 A | 5/2013 |
| JP | 2013-103647 A | 5/2013 |
| KR | 1020030033459 A | 5/2003 |
| KR | 1020050098681 A | 10/2005 |
| KR | 10-2009-0128830 A | 12/2009 |
| KR | 1020120036769 A | 4/2012 |
| WO | WO 2011/027616 A1 | 3/2011 |

* cited by examiner

Primary Examiner — Derek D Knight
(74) Attorney, Agent, or Firm — Morgan, Lewis & Bockius LLP

(57) ABSTRACT

A method for controlling a driving of a hybrid vehicle in which a motor may be selectively connected to a transmission side, may include measuring a rotating speed of the motor in an electric vehicle (EV) mode, increasing the rotating speed of the motor by performing a slip control on a clutch connected to the transmission side when the rotating speed of the motor may be less than a reference speed, at a time of switching the EV mode into a hybrid electric vehicle (HEV) mode, starting an engine, and joining an engine clutch disposed between the motor and the engine when the rotating speed of the motor may be increased to reach a rotating speed of the engine.

2 Claims, 3 Drawing Sheets

METHOD FOR CONTROLLING DRIVING OF HYBRID VEHICLE

CROSS REFERENCE TO RELATED APPLICATION

The present application claims priority of Korean Patent Application Number 10-2013-0157846 filed on Dec. 18, 2013, the entire contents of which is incorporated herein for all purposes by this reference.

BACKGROUND OF THE INVENTION

Field of the Invention

The present invention relates to a method for controlling a driving of a vehicle, and more particularly, to a method for controlling a driving of a hybrid vehicle capable of controlling a starting of the vehicle without hindering power performance of the vehicle at the time of a shortage of state of charge (SOC) of a battery.

Description of Related Art

In a hybrid vehicle, a parallel type structure is classified into a flywheel mounted electric device (FMED) type and a transmission mounted electric device (TMED) type depending on a mounting position of a motor.

FIG. 1 illustrates a hybrid system of the TMED type according to the related art, in which the motor is mounted a transmission side, and thus an electric vehicle (EV) mode which may drive a vehicle may be implemented only by a torque of the motor.

In the above EV mode, the vehicle is driven only by a motor power at the time of a starting of the vehicle or a low-speed driving section. In this case, an engine clutch which is mounted between an engine and the motor is blocked and thus the torque of the motor is transferred to a wheel to drive the vehicle.

Further, a hybrid electric vehicle (HEV) mode, the engine power and the motor power are driven together to drive the vehicle. In this case, to prevent a large shock from occurring at the moment that the engine power is connected at the time of switching the EV mode into the HEV mode during the driving of the vehicle, RPMs of the engine and the motor are synchronized with each other after the engine starts and then the engine clutch is connected, such that the motor and the engine are controlled to be smoothly connected to each other.

However, at the time of the starting of the vehicle in the EV mode, when the state of charge (SOC) of the battery is low, the rotating speed of the motor is more reduced than an engine idle speed, such that at the time of being switched into the HEV mode, the RPM of the engine may not be smoothly synchronized with the RPM of the motor.

However, according to the above-mentioned method, at the time of the shortage of the SOC residual quantity of the battery, the starting control of the vehicle may not be smoothly performed.

The matters described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a driving of a hybrid vehicle capable of controlling a starting of the vehicle without hindering power performance of the vehicle at the time of a shortage of SOC of a battery.

In an aspect of the present invention, a method for controlling a driving of a hybrid vehicle in which a motor is selectively connected to a transmission side, may include measuring a rotating speed of the motor in an electric vehicle (EV) mode, increasing the rotating speed of the motor by performing a slip control on a clutch connected to the transmission side when the rotating speed of the motor is less than a reference speed, at a time of switching the EV mode into a hybrid electric vehicle (HEV) mode, starting an engine, and joining an engine clutch disposed between the motor and the engine when the rotating speed of the motor is increased to reach a rotating speed of the engine.

The method may further include measuring a state of charge (SOC) of a battery prior to the measuring of the rotating speed of the motor.

In the increasing of the rotating speed of the motor, the reference value is an engine idle speed.

In the increasing of the rotating speed of the motor, the clutch undergoes the slip control so that the rotating speed transferred to the transmission side is kept at a predetermined rotating speed or more.

The clutch mounted between the motor and the transmission side is an odd-stage clutch of a double clutch.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
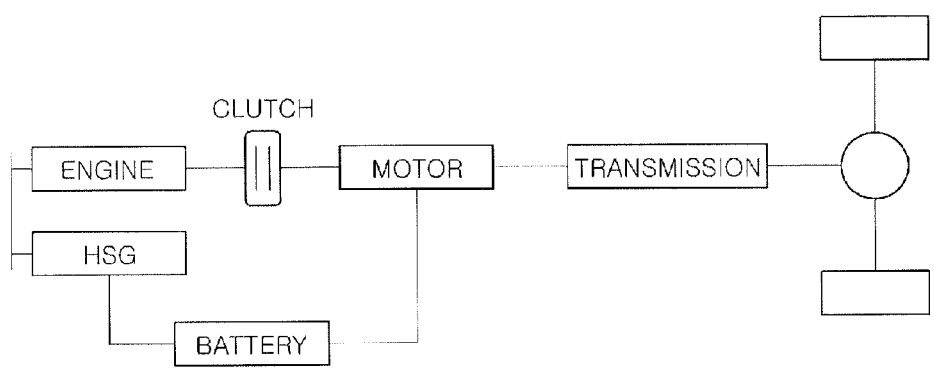
FIG. 1 is a diagram illustrating a parallel type hybrid system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

Figure 2:
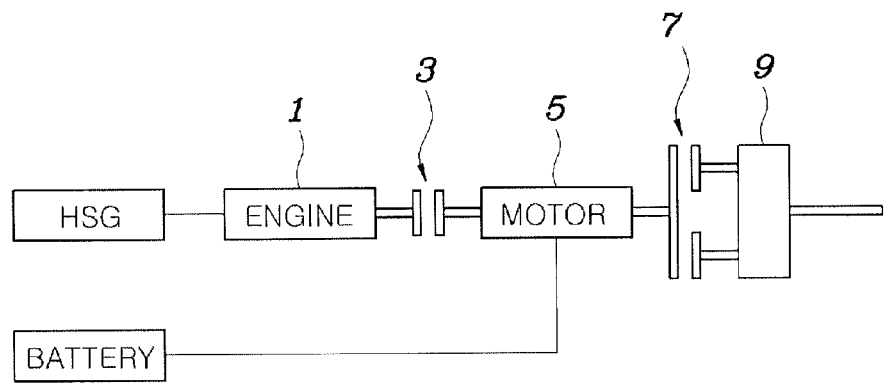
FIG. 2 is a diagram illustrating a hybrid vehicle system according to an exemplary embodiment of the present invention.
Figure 3:
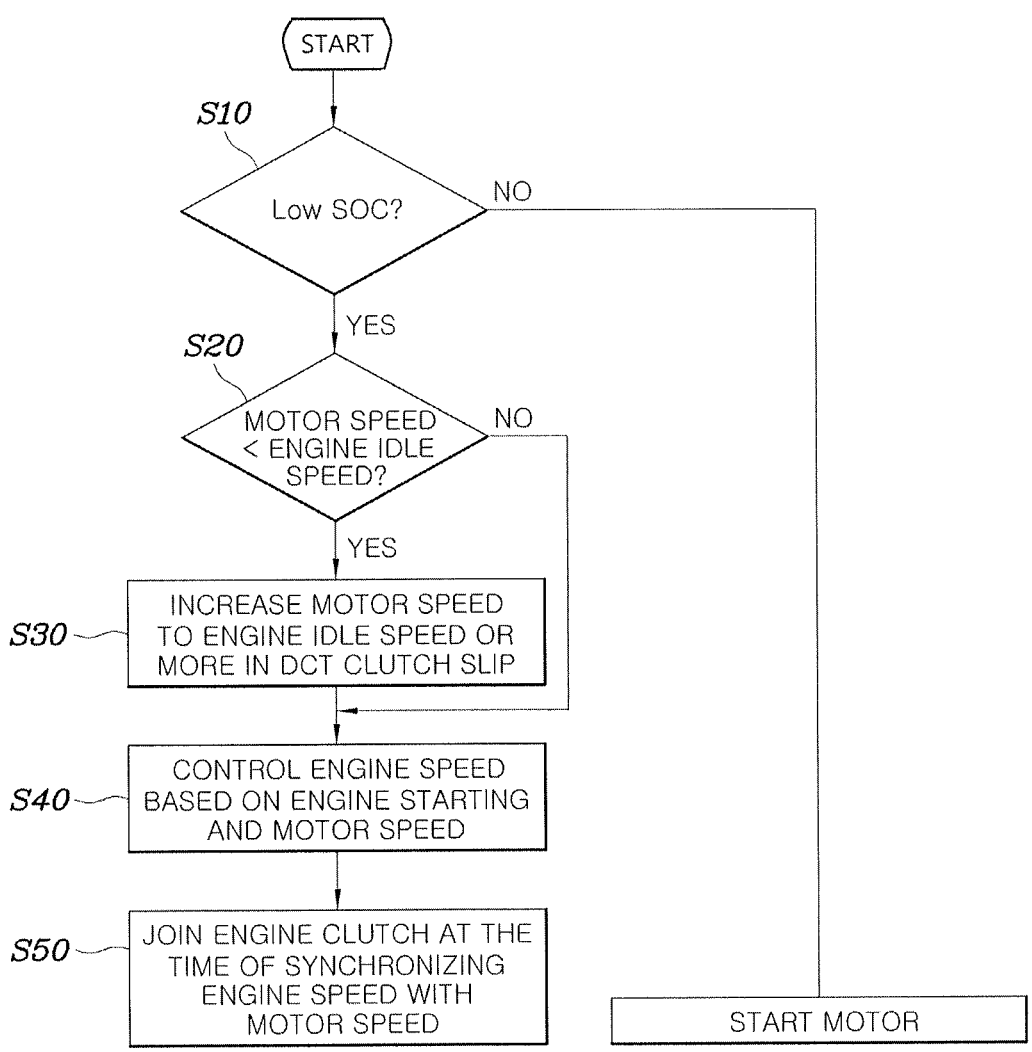
FIG. 3 is a diagram for describing a control flow depending on a method for controlling a driving of a hybrid vehicle according to an exemplary embodiment of the present invention.
Figure 4:
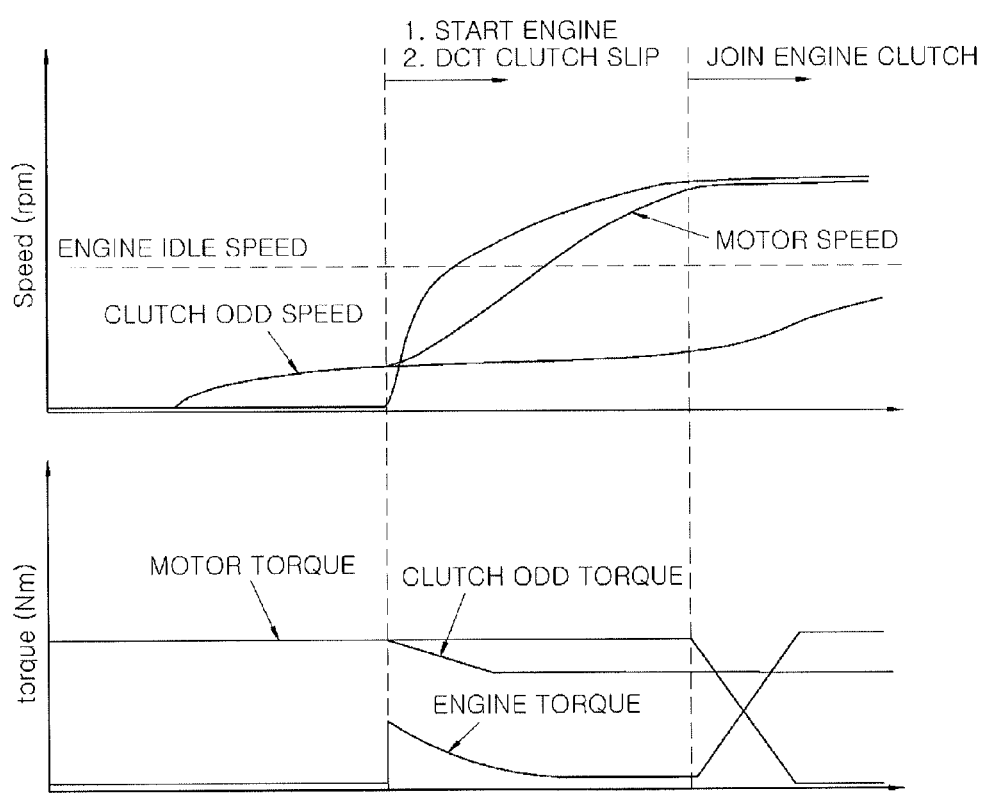
FIG. 4 is a diagram for describing a change in a rotating speed of a motor and a rotating speed of an engine at the time of a driving control according to the exemplary embodiment of the present invention.

FIG. 2 is a diagram illustrating a hybrid vehicle system according to an exemplary embodiment of the present invention, FIG. 3 is a diagram for describing a control flow depending on a method for controlling a driving of a hybrid vehicle according to an exemplary embodiment of the present invention, and FIG. 4 is a diagram for describing a change in a rotating speed of a motor and a rotating speed of an engine 1 at the time of a driving control according to the exemplary embodiment of the present invention.

A method for controlling a driving of a hybrid vehicle according to the exemplary embodiment of the present invention is configured to largely include measuring, increasing, starting an engine 1, and joining.

Describing in detail the exemplary embodiment of the present invention with reference to FIGS. 2 to 4, a method for controlling a driving of a hybrid vehicle in which a motor 5 is connected to a transmission side 9 includes: in an EV mode, measuring a rotating speed of the motor 5, increasing the rotating speed of the motor 5 by performing a slip control on the clutch 7 connected to the transmission side 9 in the case in which the rotating speed of the motor 5 is less than a reference speed, at the time of switching the EV mode into an HEV mode, starting an engine 1, joining an engine clutch 3 between the motor 5 and the engine 1 when the rotating speed of the motor 5 is increased to reach the rotating speed of the engine 1.

That is, at the time of switching the EV mode into the HEV mode, when the rotating speed of the motor 5 is reduced, a rotating load of the motor 5 is reduced by performing a slip control on the clutch 7 connected to the transmission side 9. Therefore, when the rotating speed of the motor 5 is increased as large as the reduced load and thus the rotating speed of the motor 5 reaches the rotating speed of the engine 1, the engine clutch 3 is joined and thus the driving of the vehicle is controlled in the HEV mode, such that the vehicle may be driven in the HEV mode without hindering power performance of the vehicle, thereby improving drivability of the vehicle.

According to the exemplary embodiment of the present invention, the method for controlling a driving of a hybrid vehicle may further include measuring an SOC of a battery prior to the measuring in step S10.

That is, when the SOC of the battery is smaller than a reference value, it is determined whether to perform the slip control on the clutch by comparing the rotating speed of the motor 5 with the reference speed in step S20. Therefore, even when the SOC residual quantity of the battery is small, the EV mode is switched into the HEV mode and thus the vehicle may be driven without hindering the power performance of the vehicle.

According to the exemplary embodiment of the present invention, in the increasing, the reference value may be an engine idle speed.

That is, when the rotating speed of the motor 5 is smaller than the engine idle speed in step S20, the rotating speed of the motor 5 is increased to a rotating speed larger than the engine idle speed by performing the slip control on the clutch in step S30.

Further, in the increasing, it is possible to perform the slip control on the clutch so that the rotating speed transferred to the transmission side 9 is kept at a predetermined rotating speed or more. That is, since the rotating speed of the motor 5 is controlled to be increased so that the rotating speed of the motor 5 may be synchronized with the rotating speed of the engine 1 by performing the slip control on the clutch in step S50 and the clutch undergoes the slip control so that the power above the predetermined rotating speed is transferred to the transmission side 9, the vehicle is controlled to be continuously driven.

Further, according to the exemplary embodiment of the present invention, the clutch mounted between the motor 5 and the transmission may be an odd-stage clutch of a double clutch.

According to the exemplary embodiments of the present invention, at the time of switching the EV mode into the HEV mode, when the RPM of the motor is reduced due to the SOC residual quantity of the battery, the rotating speed of the motor is increased by slip controlling the clutch and then the engine clutch is fastened to drive the vehicle in the HEV mode without hindering the power performance of the vehicle, thereby improving the drivability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a driving of a hybrid vehicle in which a motor is selectively connected to a transmission side, comprising:
    measuring a state of charge (SOC) of a battery;
    measuring a rotating speed of the motor in an electric vehicle (EV) mode;
    increasing the rotating speed of the motor by performing a slip control on a clutch mounted between the motor and the transmission side and connected to the transmission side when the rotating speed of the motor is less than a reference speed, at a time of switching the EV mode into a hybrid electric vehicle (HEV) mode;
    starting an engine; and
    joining an engine clutch disposed between the motor and the engine when the rotating speed of the motor is increased to reach a rotating speed of the engine,
    wherein, in the increasing of the rotating speed of the motor, the reference value is an engine idle speed, and
    wherein in the increasing of the rotating speed of the motor, the clutch undergoes the slip control so that the rotating speed transferred to the transmission side is kept at a predetermined rotating speed or more.

2. The method of claim 1, wherein the clutch mounted between the motor and the transmission side is an odd-stage clutch of a double clutch.

\* \* \* \* \*